US009411826B2

(12) United States Patent
Matsumoto (10) Patent No.: US 9,411,826 B2
(45) Date of Patent: Aug. 9, 2016

(54) IMAGE PROCESSING APPARATUS CONTROL METHOD AND PROGRAM

(75) Inventor: Koichi Matsumoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 276 days.

(21) Appl. No.: 13/176,558

(22) Filed: Jul. 5, 2011

(65) Prior Publication Data

US 2012/0017181 A1    Jan. 19, 2012

(30) Foreign Application Priority Data

Jul. 16, 2010    (JP) .................................. 2010-161941

(51) Int. Cl.
*G06F 3/048*    (2013.01)
*G06F 17/30*    (2006.01)
*G06F 3/01*    (2006.01)

(52) U.S. Cl.
CPC .... *G06F 17/30265* (2013.01); *G06F 17/30274* (2013.01); *G06F 17/30277* (2013.01)

(58) Field of Classification Search
CPC . G06F 3/04817; G06F 3/0481; G06F 3/0482; G06F 17/30274; H04N 1/00442
USPC ........................................................ 715/838
See application file for complete search history.

(56) References Cited

U.S. PATENT DOCUMENTS

| | | | |
|---|---|---|---|
| 6,784,925 B1 * | 8/2004 | Tomat et al. ............. | 348/207.11 |
| 7,779,358 B1 * | 8/2010 | Gupta et al. .................. | 715/730 |
| 8,380,786 B2 * | 2/2013 | Hoffert et al. ................. | 709/203 |
| 2005/0001024 A1 * | 1/2005 | Kusaka et al. ................ | 235/375 |
| 2005/0069107 A1 * | 3/2005 | Tanaka et al. .............. | 379/93.17 |
| 2005/0213147 A1 * | 9/2005 | Minatogawa ................ | 358/1.15 |
| 2005/0262125 A1 * | 11/2005 | Kanai ........................... | 707/101 |
| 2006/0044599 A1 * | 3/2006 | Lipowitz et al. ............. | 358/1.15 |
| 2009/0044128 A1 * | 2/2009 | Baumgarten et al. ......... | 715/738 |
| 2009/0207254 A1 * | 8/2009 | Tomat et al. ............... | 348/207.1 |
| 2009/0279116 A1 * | 11/2009 | Nishio ................. | G06K 9/2081 358/1.13 |
| 2010/0153882 A1 * | 6/2010 | Nakagawa et al. ........... | 715/838 |
| 2010/0199220 A1 * | 8/2010 | Tanichi et al. ................ | 715/838 |
| 2010/0333204 A1 * | 12/2010 | Shpits ............................. | 726/24 |
| 2011/0099523 A1 * | 4/2011 | Van Zee et al. ............... | 715/838 |

FOREIGN PATENT DOCUMENTS

| | | |
|---|---|---|
| JP | 2003-270880 A | 9/2003 |
| JP | 2010-049317 A | 3/2010 |

* cited by examiner

*Primary Examiner* — Nicholas Augustine
(74) *Attorney, Agent, or Firm* — Canon U.S.A., Inc. IP Division

(57) ABSTRACT

A method of controlling an image processing apparatus communicating with an image server storing first images, second images wherein one of the first images and one of the second images are managed as one image data in the image server. The method includes downloading a plurality of first images from the image server and displaying the plurality of first images; selecting at least one of the first images from the displayed plurality of first images; requesting the image server for second images associated with the selected at least one first images; and downloading the requested second images from the image server. When at least one of the second images is downloaded, a determination is made as to whether the downloaded second images correspond to the selected images, and if it is determined not, a notice indicating that the selected images can not be downloaded is displayed.

18 Claims, 14 Drawing Sheets

IMAGE PROCESSING APPARATUS CONTROL METHOD AND PROGRAM

BACKGROUND OF THE INVENTION

1. Field of the Invention

The present invention relates to an image management system of downloading desired images from a Web site including a plurality of images based on a keyword search and storing/printing the images.

2. Description of the Related Art

In recent years, various information is obtainable by accessing Web sites on the Internet. Users can download desired images from a Web site covering many images and display/store/print the desired images by software called an image management system application. When a user downloads a desired image from such a Web site and stores/prints the desired image, generally, the user first downloads corresponding thumbnail images of actual images by keywords and displays a list of the thumbnail thereof. Next, from the list of thumbnail images, the user selects a desired thumbnail image and downloads an actual image corresponding to the thumbnail image.

However, this method involves a time lag between when the user downloads a thumbnail image and when the user downloads an actual image. Thus, the actual image may already have been deleted by the time the user downloads the actual image. If the user still tries to download the actual image, the user ends up receiving a different image (for example, an image displaying "Sorry") as if it were the corresponding actual image. In this case, there is a problem that the user stores/prints the different image, so that much disk capacity may be consumed or expensive paper media may be printed.

SUMMARY OF THE INVENTION

According to one aspect of the present invention, there is provided a method of controlling an image processing apparatus communicating with an image server storing first images, second images wherein one of the first images and one of the second images are managed as one image data in the image server. The method includes downloading a plurality of first images from the image server and displaying the plurality of first images; selecting at least one of the first images from the displayed plurality of first images; requesting the image server for second images associated with the selected at least one first images; and downloading the requested second images from the image server. When at least one of the second images is downloaded, a determination is made as to whether the downloaded second images correspond to the selected images, and if it is determined that at least one of the downloaded second images does not correspond to any one of the selected first images, a notice indicating that the selected images can not be downloaded is displayed. The downloaded second image determined to correspond to the at least one of the selected first images are stored or printed and the downloaded second image that is determined not to correspond to any one of the selected first images is not stored or printed.

According to another aspect of the present invention, there is provided an image processing system for controlling an image processing apparatus communicating with an image server storing first images, second images wherein one of the first images and one of the second images are managed as one image data in the image server, including at least one processor coupled via a bus to a memory, the processor being programmed to control one or more of: a downloading unit for downloading a plurality of first images from the image server and displaying the plurality of first images; a selecting unit for selecting at least one of the first images from the displayed plurality of first images; and a requesting unit for requesting the image server for second images associated with the selected at least one first images. The downloading unit is configured to download the requested second images from the image server. When at least one of the second images is downloaded, a determination is made as to whether the downloaded second images correspond to the selected images, and if it is determined that at least one of the downloaded second images does not correspond to any one of the selected first images, a notice indicating that the selected images can not be downloaded is displayed. The downloaded second image determined to correspond to the at least one of the selected first images are stored or printed and the downloaded second image that is determined not to correspond to any one of the selected first images is not stored or printed.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings. However, the scope of the present invention is not limited to dimensions, materials, and shapes of components described in the exemplary embodiments or to the relative arrangement of the components, unless otherwise specified.

Figure 1:
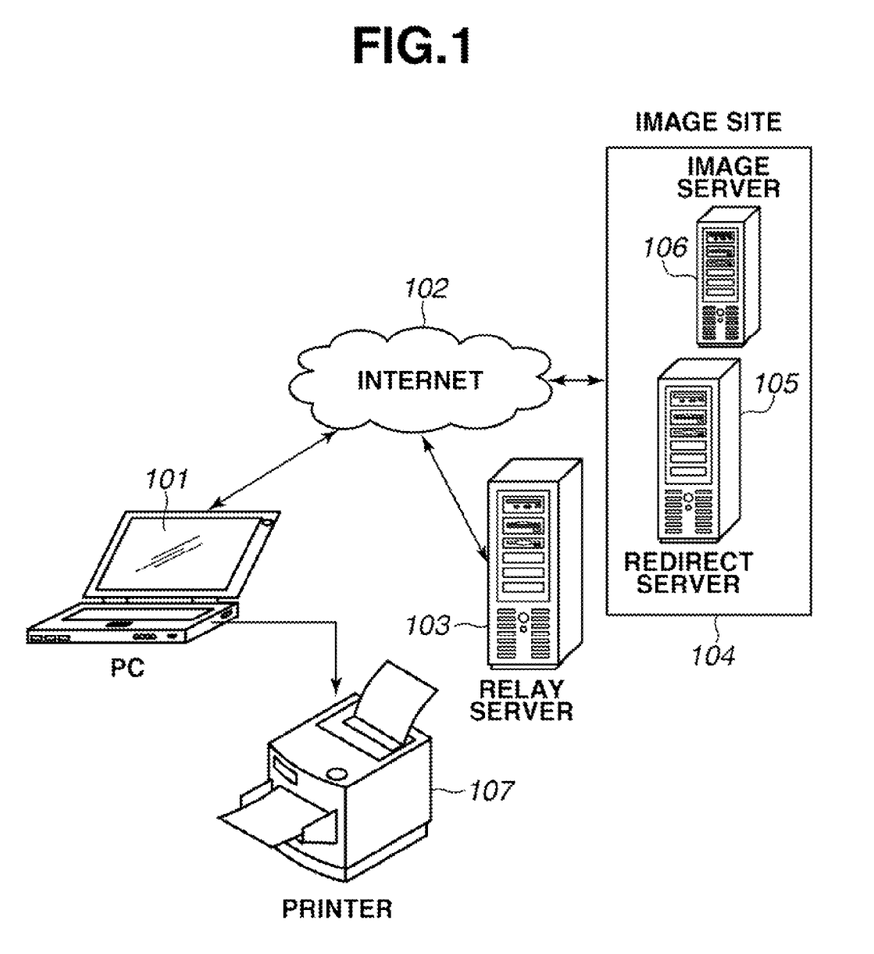
FIG. 1 illustrates a configuration of an image management system including a download image processing apparatus of the present invention.

A first exemplary embodiment of the present invention will be hereinafter described. FIG. 1 is a block diagram illustrating a configuration of an image management system including a download image storage/printing apparatus of the present invention. In FIG. 1, a personal computer (PC) 101 is an image processing apparatus connected to the Internet 102. To display desired images, the PC 101 downloads the desired images from an image server 106 via the Internet 102, a relay server 103, and a redirect server 105 in an image management site 104. The image server 106 may include a redirect function as the redirect server 105. The PC 101 can store images downloaded from the image site 104 in a hard disk 204 in the PC 101. Further, the PC 101 can locally be connected to a printer 107 and can cause the printer 107 to print the images. Image site 104 is example of an image server. The image site 104 can be implemented by plural computers as shown FIG. 1. The image server may be implemented by one computer.

Figure 2:
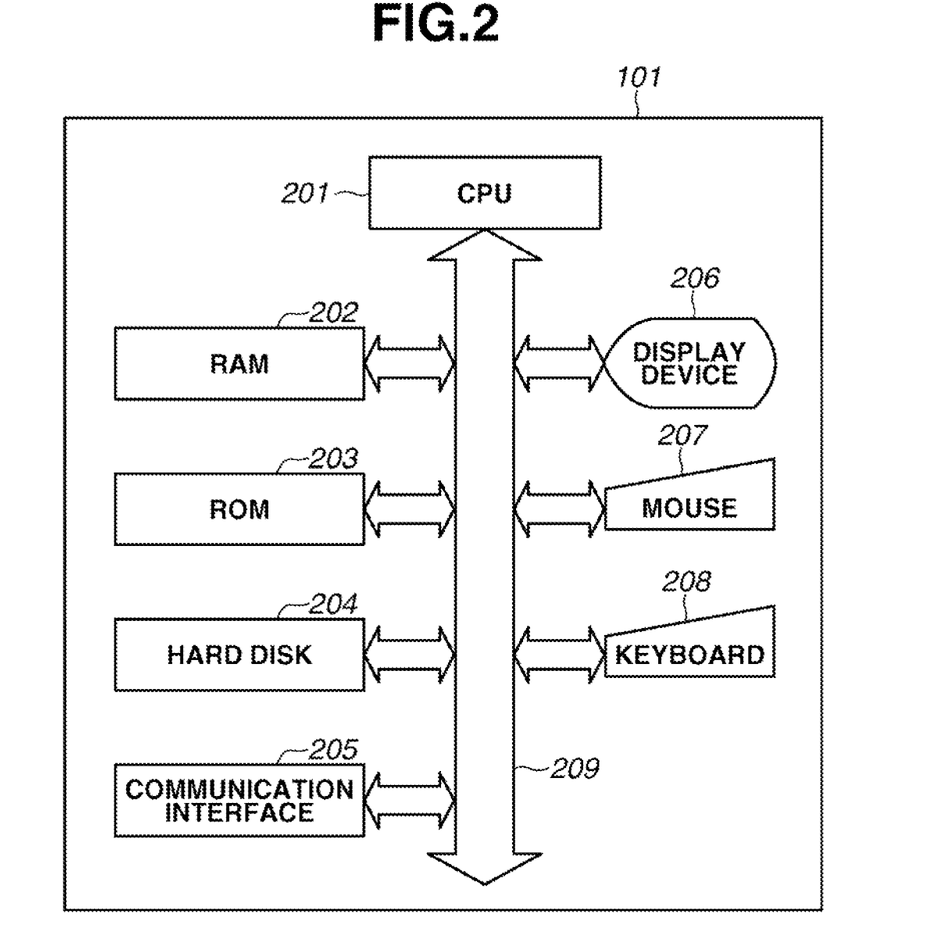
FIG. 2 illustrates a configuration of a computer as the download image processing apparatus of the present invention.

FIG. 2 is a block diagram illustrating a configuration of the PC 101. A central processing unit (CPU) 201 calculates data, and determines and controls commands based on programs stored in a random access memory (RAM) 202, a read-only memory (ROM) 203, or the hard disk 204. The RAM 202 serves as a temporary storage area when the CPU 201 executes various processes. The hard disk 204 stores downloaded images and records an operating system (OS), a browser, and other application software.

For example, a communication interface 205 is an interface such as a universal serial bus (USB), a small computer system interface (SCSI), or a wireless device that executes data communication with the printer 107. The communication interface 205 also serves as a network interface that executes data communication with the external image site 104 via the Internet 102. A display device 206 includes a cathode-ray tube or a liquid crystal display and a graphics controller to display a graphical user interface (GUI).

A mouse 207 and a keyboard 208 are input devices through which users give various instructions to the PC 101. A system bus 209 transfers data between the CPU 201 and the RAM 202, the ROM 203, the hard disk 204, or the like.

Figure 3:
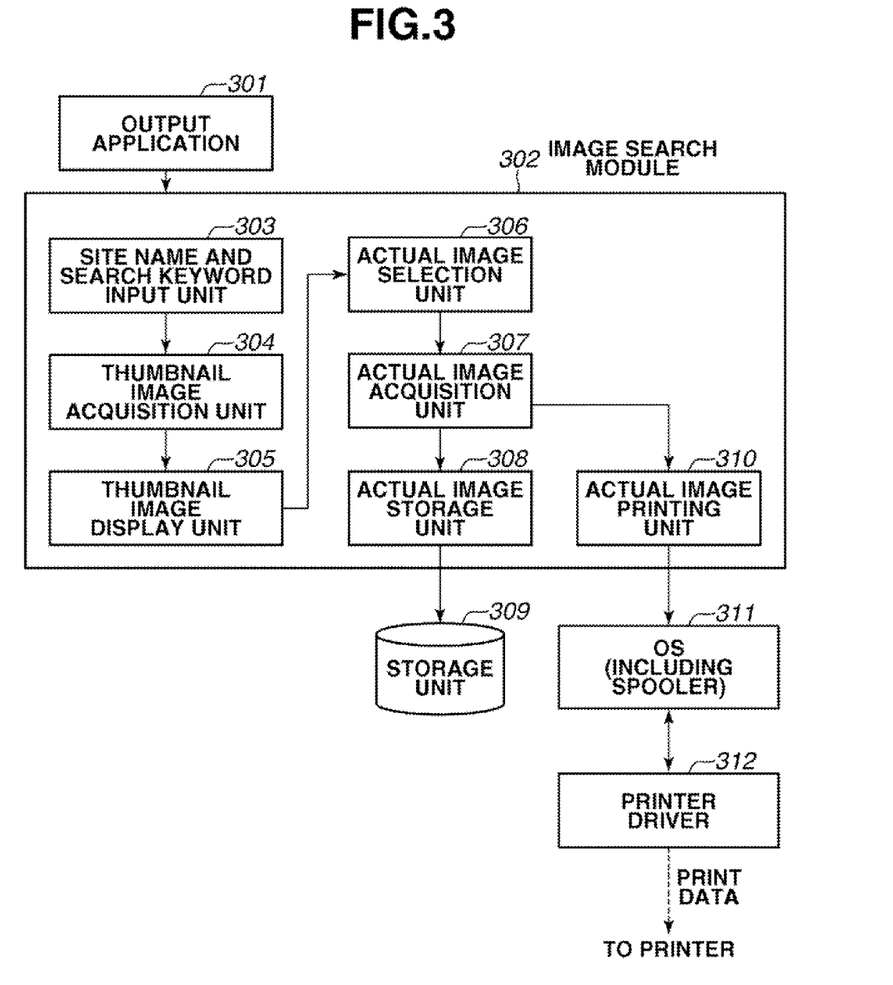
FIG. 3 illustrates a configuration of software on the computer as the processing apparatus of the present invention.
Figure 4:
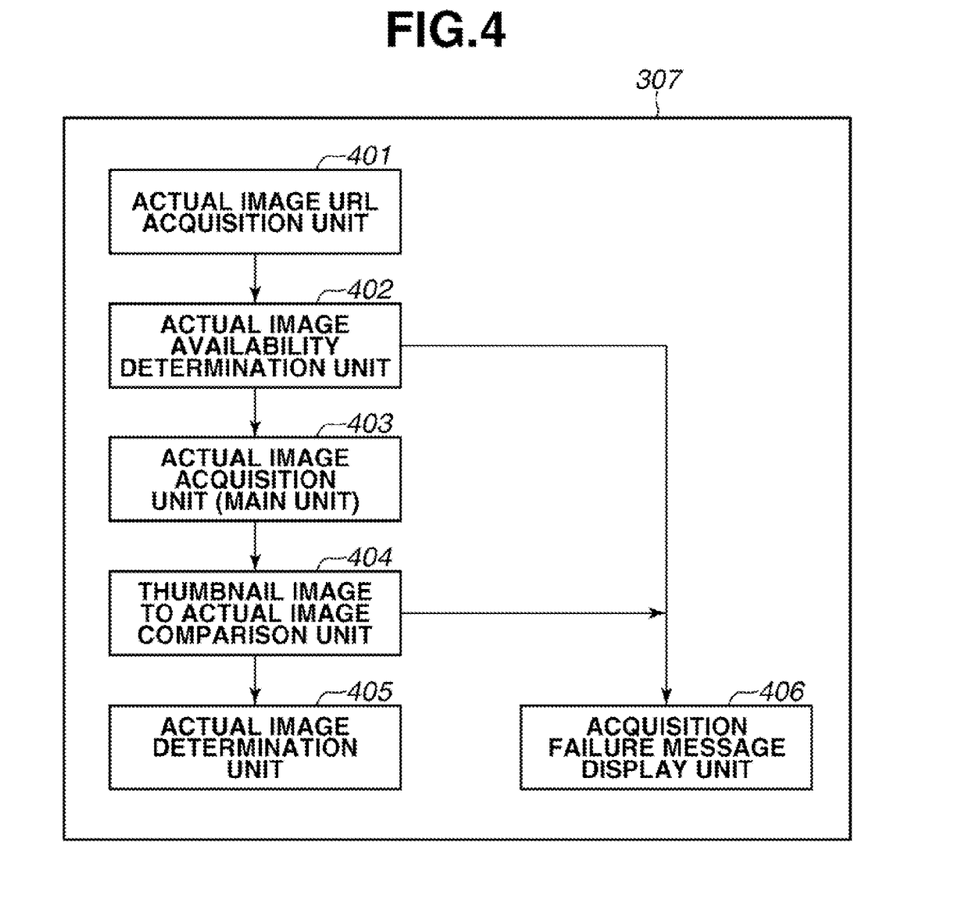
FIG. 4 illustrates a configuration of an actual image acquisition unit of the software on the computer as the processing apparatus of the present invention.

FIGS. 3 and 4 are block diagrams illustrating configurations of software on the PC 101. Programs that operate on the PC 101 will be hereinafter described with reference to FIGS. 3 and 4. In FIG. 3, an image search module 302 is invoked from an output application 301. For example, when a user gives instructions on the output application 301 to acquire target images from the image Web site 104 to store or print the images, the image search module 302 is executed.

To search for a desired image, the user inputs an image Web site name and a keyword to unit 303 in the image search module 302. The image Web site 104 holds each of the actual images and data such as a thumbnail image and image attributes associated with the actual images. The image Web site 104 also gives keywords to the pair of the actual image and the data. The image search module 302 notifies the input image Web site 104 of the keyword, and a thumbnail image acquisition unit 304 acquires corresponding thumbnail images as first images. A thumbnail image display unit 305 displays a list of the acquired thumbnail images. An actual image selection unit 306 enables the user to select a desired image from the list of thumbnail images. An actual image acquisition unit 307 sends a request to the image Web site 104 to acquire an actual image as a second image associated with the selected thumbnail image.

Referring to FIG. 4, when the actual image acquisition unit 307 accesses the image Web site 104, the redirect server 105 of the image Web site 104 receives the access and sends a uniform resource locator (URL) of the actual image. An actual image URL acquisition unit 401 receives the URL. An actual image acquisition unit (main unit) 403 accesses the received actual image URL again, to acquire the actual image (second image). A thumbnail image to actual image comparison unit 404 compares the acquired actual image (second image) file with the previously acquired thumbnail (first image) information. If the images do not match, the thumbnail image to actual image comparison unit 404 determines that the acquired actual image (second image) is not the desired actual image. In this case, a message display unit 406 displays an acquisition failure message. If the images match, an actual image determination unit 405 determines that the acquired actual image is the desired actual image. An actual image storage unit 308 can store the acquired image data in a storage unit 309. In addition, an actual image printing unit 310 can cause the printer 107 to print the acquired image data.

When the image search module 302 receives print start instructions from the user, the actual image printing unit 310 causes a printer driver 312 to execute a rendering process on the image acquired from the actual image acquisition unit 307 via an OS 311. The OS 311 provides an application programming interface (API) so that the image search module 302 can exchange print setting data with the printer driver 312. In addition, the OS 311 provides an API to execute the rendering process. In addition, the OS 311 includes various types of control software, such as a spooler system that manages print jobs and a port monitor that outputs printer commands to ports. However, detailed descriptions of such software will be omitted herein. Based on the rendering process executed by the actual image printing unit 310, the printer driver 312 generates print data. After conversion to printer commands, the printer driver 312 sends the printer commands to the printer 107 via the OS 311. The printer 107 records the actual image on a recording paper.

Figure 5:
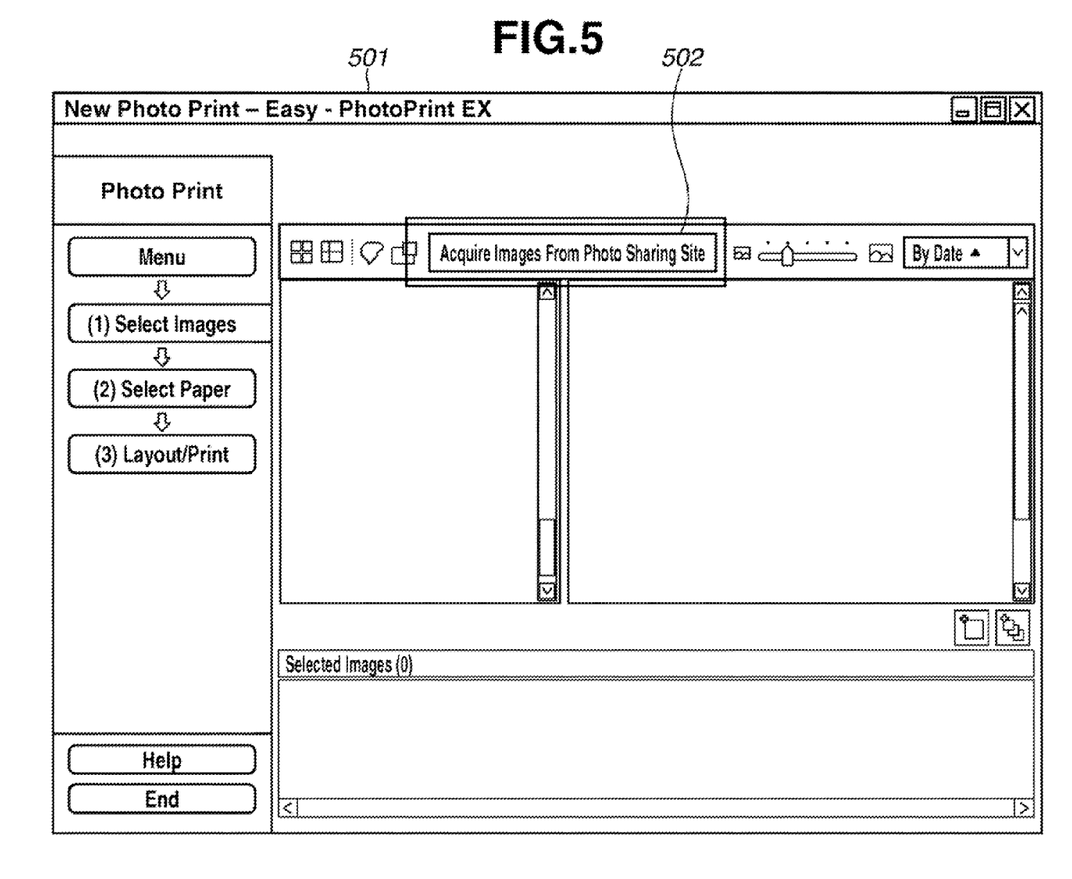
FIG. 5 illustrates a user interface (UI) for activating the software on the computer of the present invention.
Figure 6:
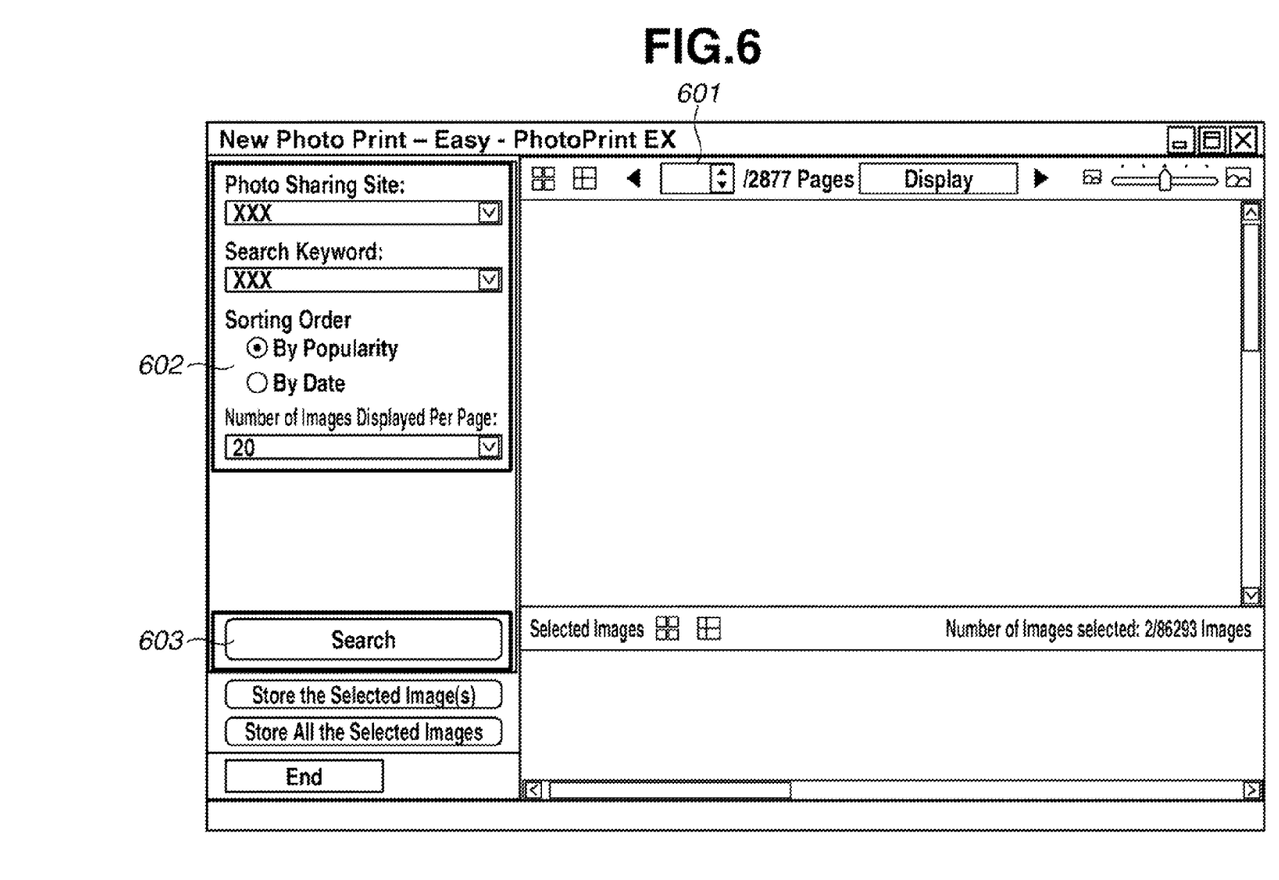
FIG. 6 illustrates an image search screen of the computer as the processing apparatus of the present invention.

FIGS. 5 to 8 illustrate examples of a GUI screen displayed by the software on the PC 101 of the image management system including the download image storage/printing apparatus according to the present exemplary embodiment. FIG. 5 illustrates a screen displaying the above output application 301 on the GUI. The screen includes a button 502 to activate the image search module 302. By pressing this button 502 for activation, an image search screen 601 is displayed as illustrated in FIG. 6. By inputting an image site name or a search keyword in an area 602 and pressing a search button 603, the user can acquire thumbnail images from a target image site 104. The acquired thumbnail images are transferred to a list display screen 701 in FIG. 7.

Figure 7:
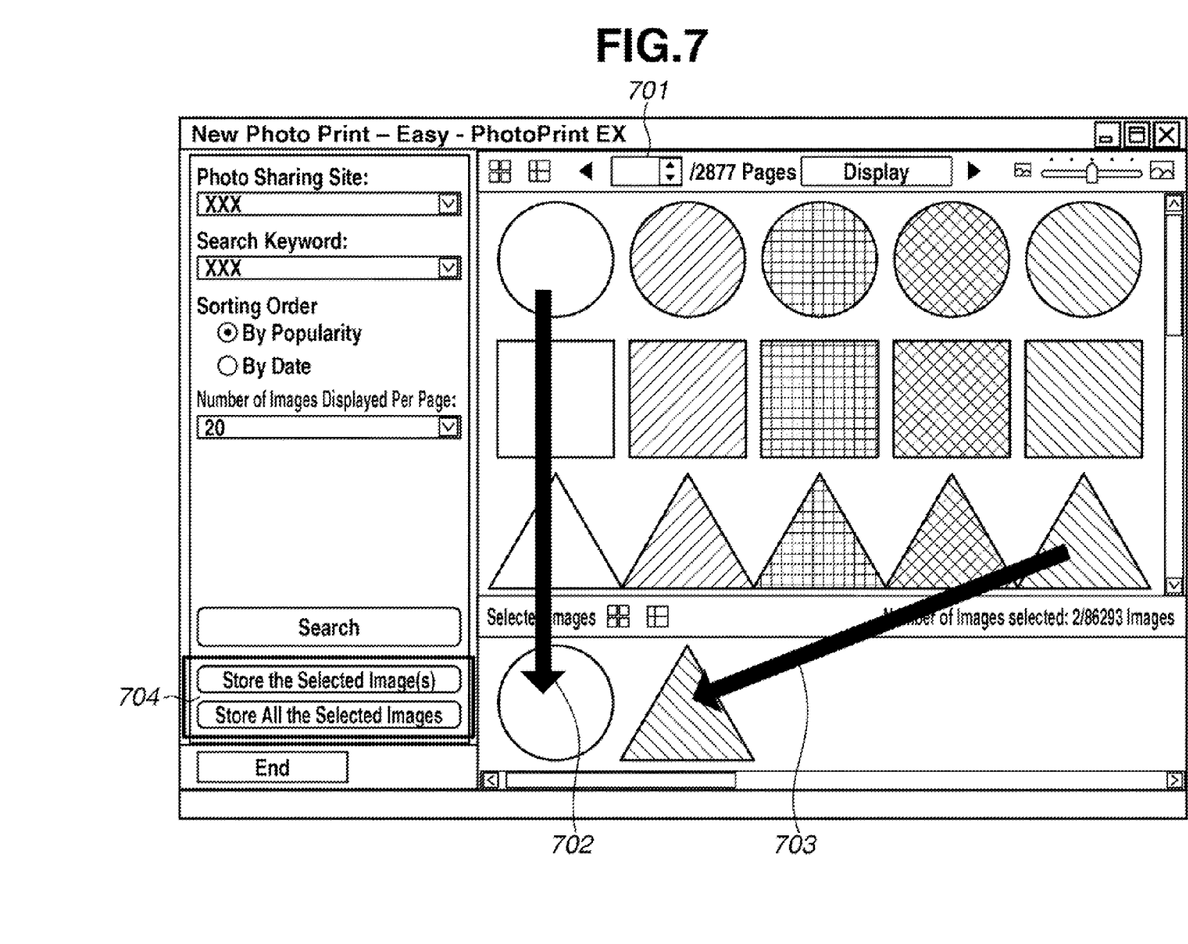
FIG. 7 illustrates an operation on the image search screen of the computer as the processing apparatus of the present invention.
Figure 8:
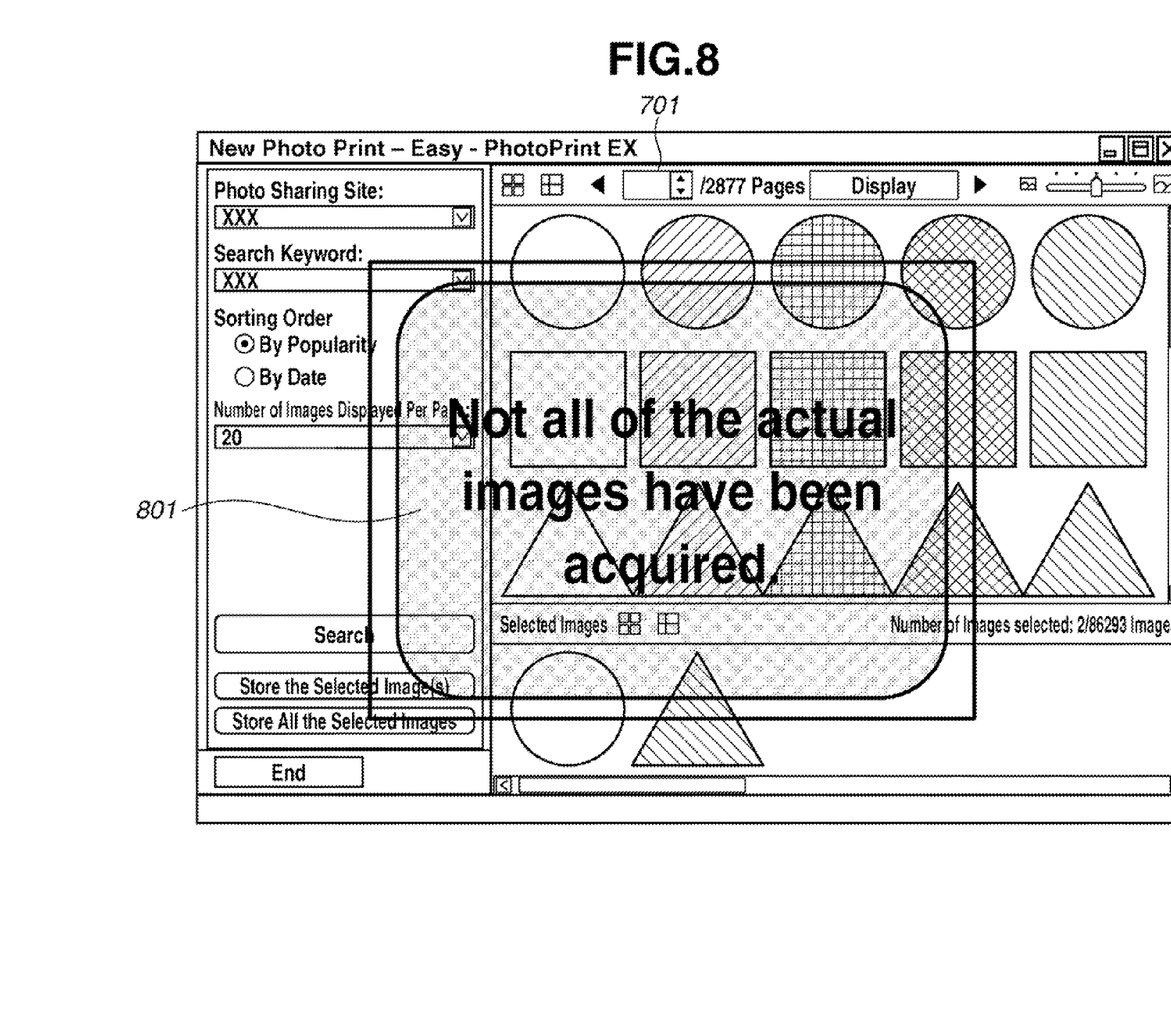
FIG. 8 illustrates an example of a notice of image search results obtained by the computer as the processing apparatus of the present invention.

By a drag-and-drop operation, the user selects (operation illustrated by 702 and 703) desired images from the list of thumbnail images. The selected images are displayed in a selection area. When the user has selected all the desired images, the user presses a selection image storage button 704 or a selection image print button. The image search module 302 downloads actual images associated with the selected thumbnail images from the image Web site 104 and causes the storage unit 309 to store the images therein or causes the printer 107 to print the images. In this process, if the selected thumbnail images and the downloaded actual images do not match, the unmatched actual images are not stored (or printed). Instead, as illustrated in FIG. 8, a message stating that not all of the actual images are available (an acquisition failure message 801) is displayed.

Figure 9:
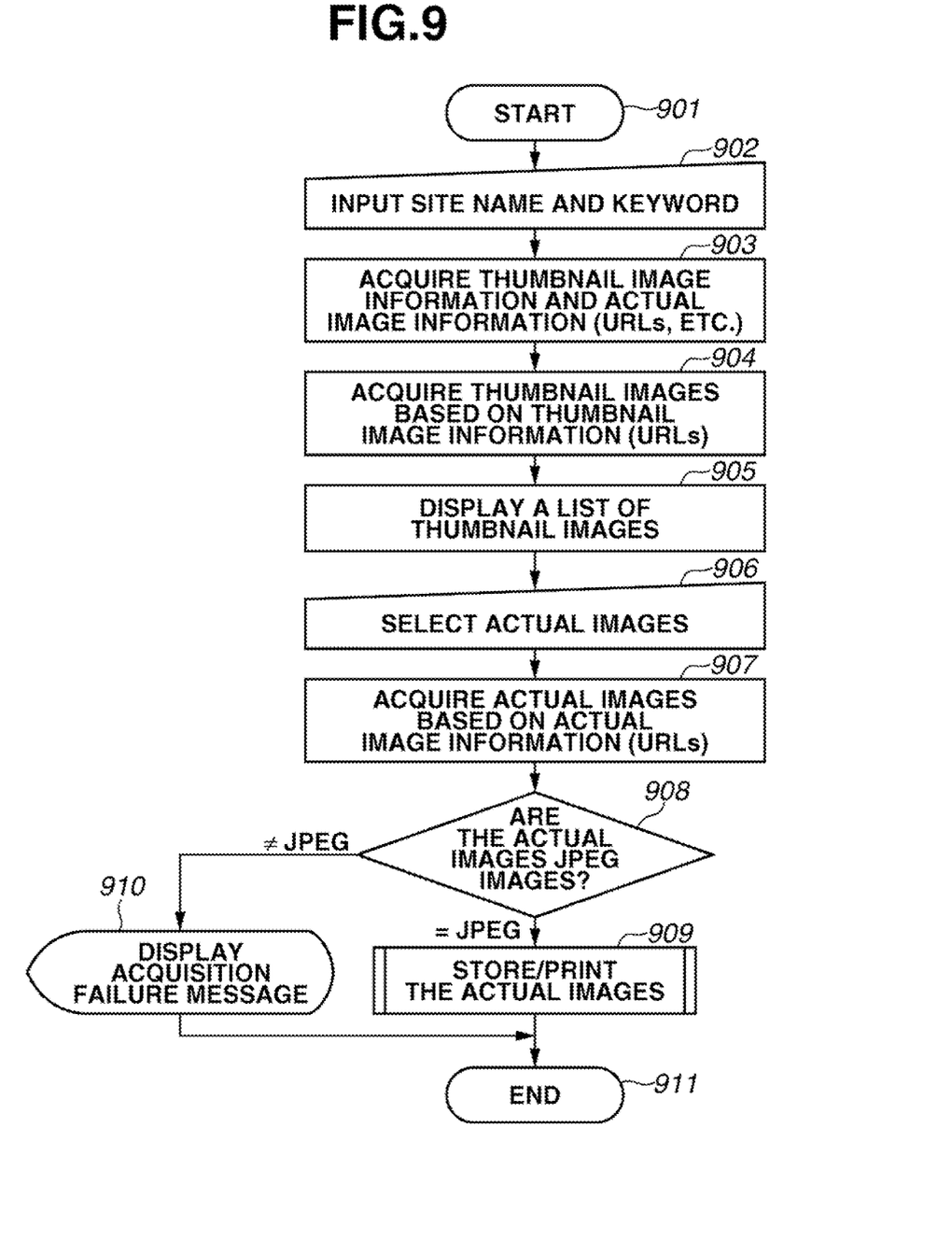
FIG. 9 is a flow chart according to a first exemplary embodiment of the present invention.
Figure 12:
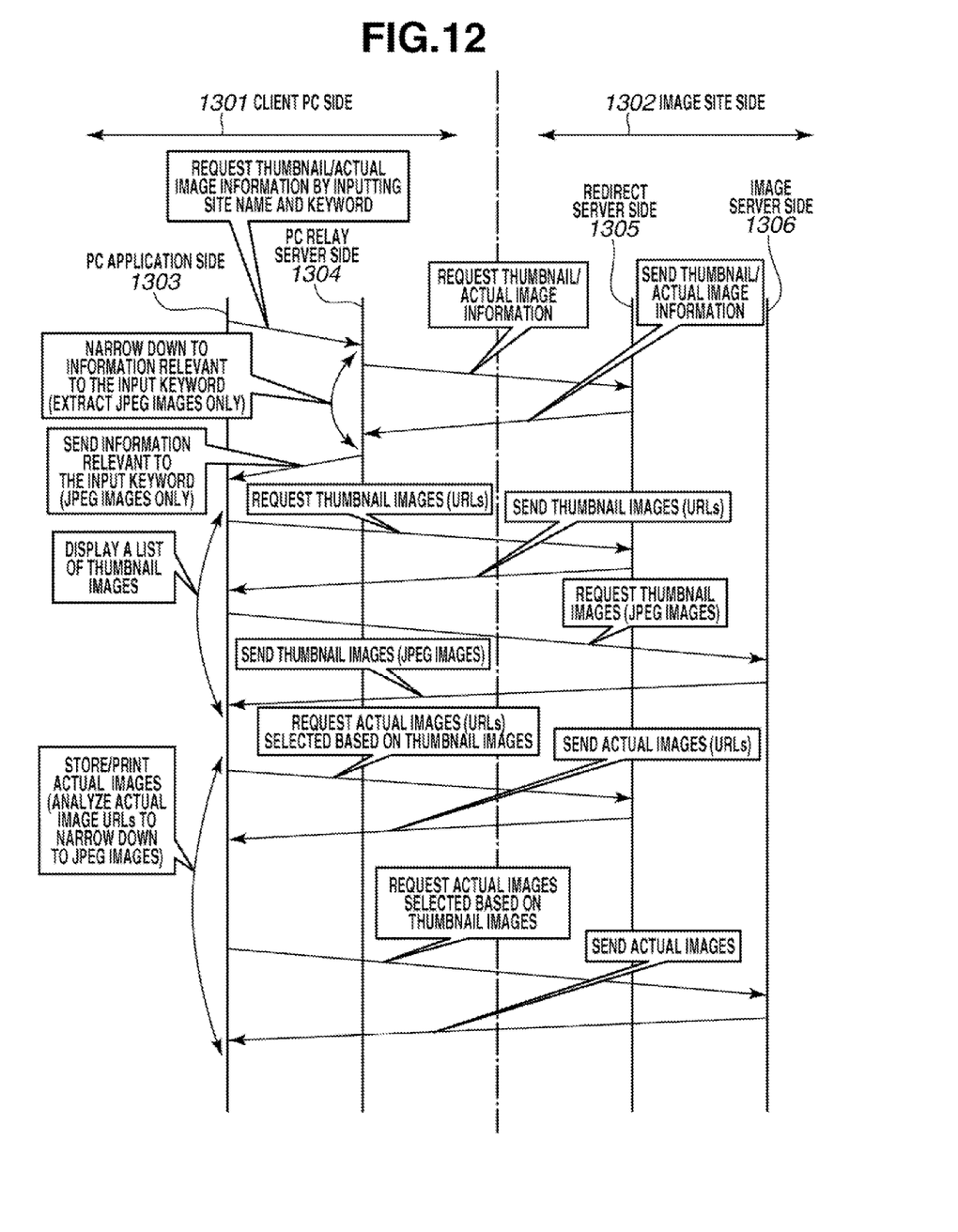
FIG. 12 is a state transition diagram according to the first exemplary embodiment of the present invention.
Figure 13:
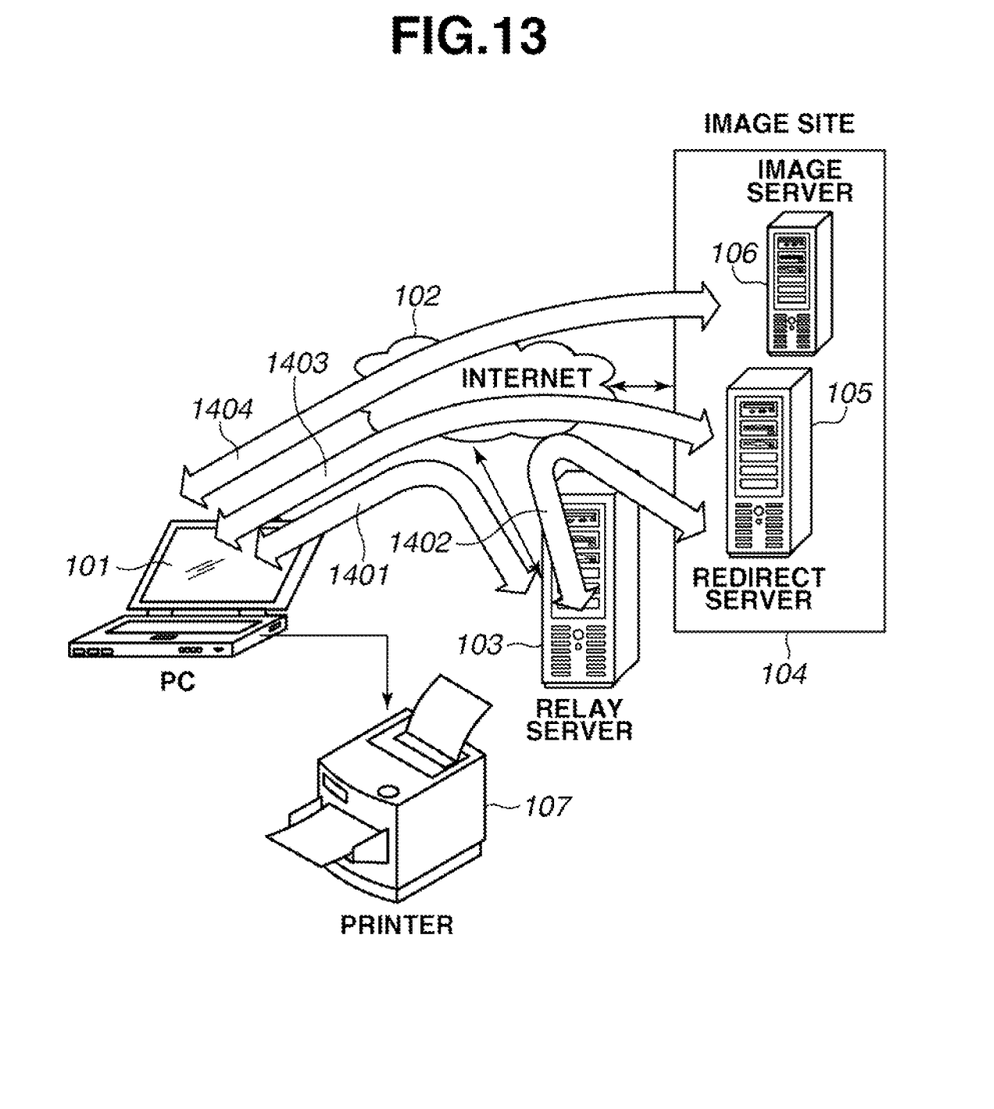
FIG. 13 is a data flow diagram according to the first exemplary embodiment of the present invention.

The operation will be hereinafter described with reference to the flow chart in FIG. 9, the state transition diagram in FIG. 12, and the data flow diagram in FIG. 13. First, in step S901, to acquire images from the image site 104, the user presses the button 502 on the output application 501. With the press of this button 502, the image search module 302 is activated, and the image search screen 601 is displayed. In step S902, the user inputs the name of the image Web site 104 and a search keyword on the image search screen 601. By pressing the search button 603, the PC 101 sends the input information to the relay server 103, as illustrated in flow 1401. The relay server 103 accesses the image Web site 104 based on the sent information, as illustrated in flow 1402. In step S903, the relay server 103 acquires information concerning the searched images (URLs of thumbnail and actual images, for example) from the image site 104, as illustrated in flow 1403. The relay server 103 provides the image search module 302 (client PC 101) with only the images of joint photographic experts group (JPEG) format, which is an image type indicated by the image attribute.

Next, in step S904, the image search module 302 directly accesses the image Web site 104 based on the acquired URLs of the thumbnail images. The redirect server 105 in the image Web site 104 first receives the access and once returns the URLs where the thumbnail images actually exist as illustrated in flow 1403. In step S904, by accessing the returned URLs again, as illustrated in flow 1404, the PC 101 can acquire the thumbnail images. In step S905, by repeating this process, a list of thumbnail images is displayed. In step S906, the user selects desired images from the displayed list of thumbnail images.

Next, in step S907, by pressing the selection image storage (or print) button, the user acquires the actual images corresponding to the selected thumbnail images. As in the case of the acquisition of the thumbnail images, when acquiring the actual images, the image Web site 104 first causes the redirect server 105 to return the URLs where the actual images actually exist. In step S907, by accessing the returned URLs again, the image search module 302 can acquire the actual images. Next, in step S908, the image search module 302 determines whether each of the received actual images is a JPEG image. If not (≠JPEG in step S908), the image search module 302 determines that not all of the received actual images are the desired images. Thus, in step S910, instead of storing (or printing) the received actual images, the message display unit 406 displays the acquisition failure message 801. On the other hand, if the received actual images are JPEG images (=JPEG in step S908), the image search module 302 determines that the received actual images are the desired images. Thus, in step S909, the actual image storage unit 308 stores the received actual images or the actual image printing unit 310 prints the received actual images.

Figure 10:
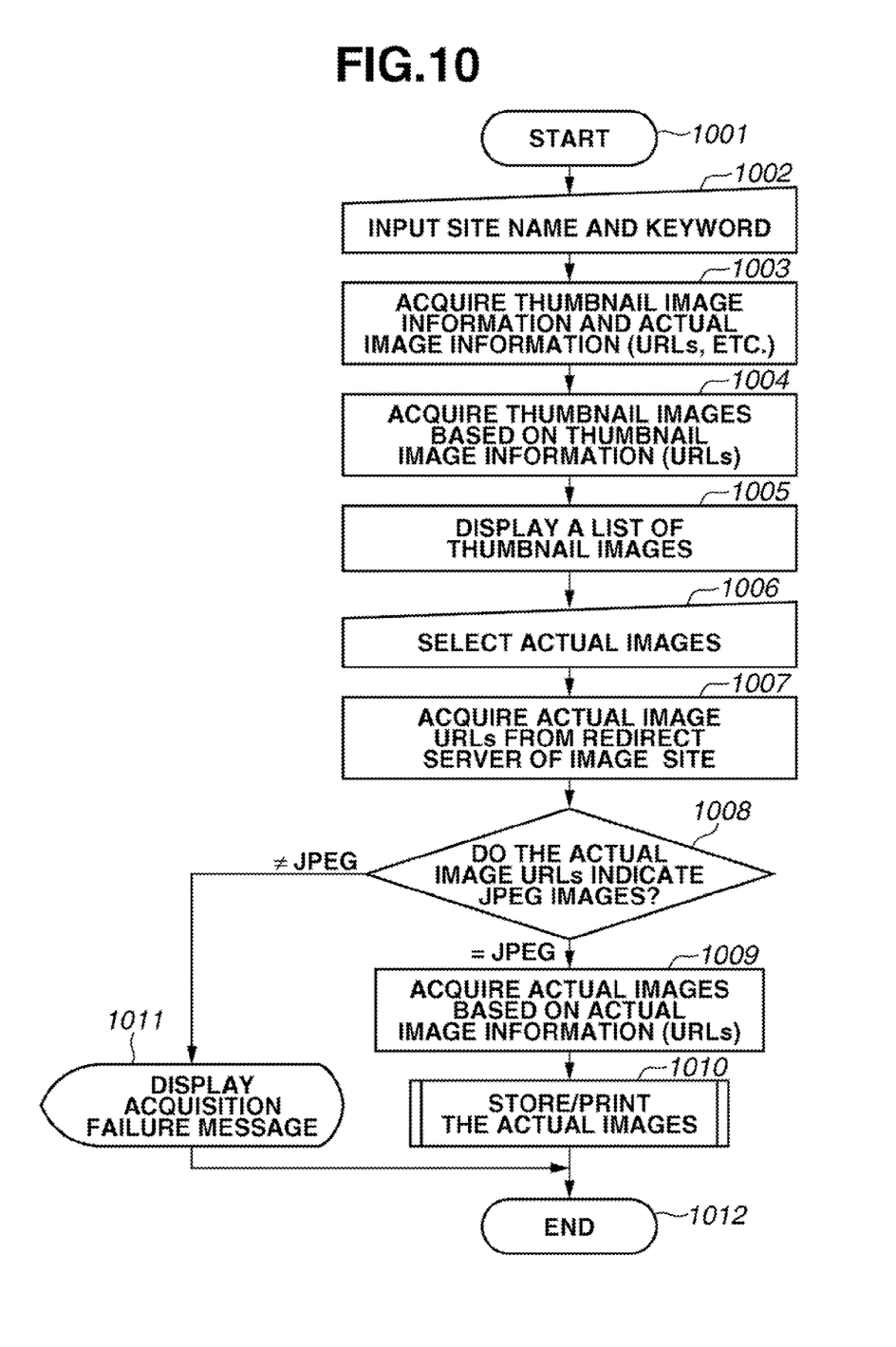
FIG. 10 is a flow chart according to a second exemplary embodiment of the present invention.

A second exemplary embodiment according to the present invention will be hereinafter described. Another method that does not download undesired actual images will be described with reference to the flow chart in FIG. 10. Since steps 1001 to 1006 of the flow chart in FIG. 10 are identical to steps 901 to 906 of the flow chart in FIG. 9 according to the first exemplary embodiment, repetitive descriptions thereof will be omitted.

In step S1007, by pressing the selection image storage (or print) button, the user acquires the URLs of the actual images. As in the case of the acquisition of the thumbnail images, when acquiring the actual images, the redirect server 105 in the image Web site 104 first receives the access and once returns the URLs where the actual images actually exist. In step S1008, by analyzing the returned URLs, the image search module 302 determines whether each of the sent actual image URLs indicates a JPEG image. If so (=JPEG in step S1008), in step S1009, the image search module 302 accesses the returned URLs again to acquire the actual images. In step S1010, the actual image storage unit 308 stores the received actual images or the actual image printing unit 310 prints the received actual images. On the other hand, if any one of the received actual image URLs does not indicate a JPEG image (≠JPEG in step S1008), the image search module 302 determines that not all of the received actual images are the desired images. Thus, in step S1011, the message display unit 406 displays the acquisition failure message 801, and the image search module 302 does not access the image server 106.

A third exemplary embodiment according to the present invention will be hereinafter described. Another method that does not download undesired actual images will be hereinafter described with reference to the flowchart of FIG. 11A. In the third exemplary embodiment, the same steps as steps 901 to 906 of the flow chart in FIG. 9 according to the first exemplary embodiment are used. Thus, the subsequent determination processes will be hereinafter described.

Figure 11A:
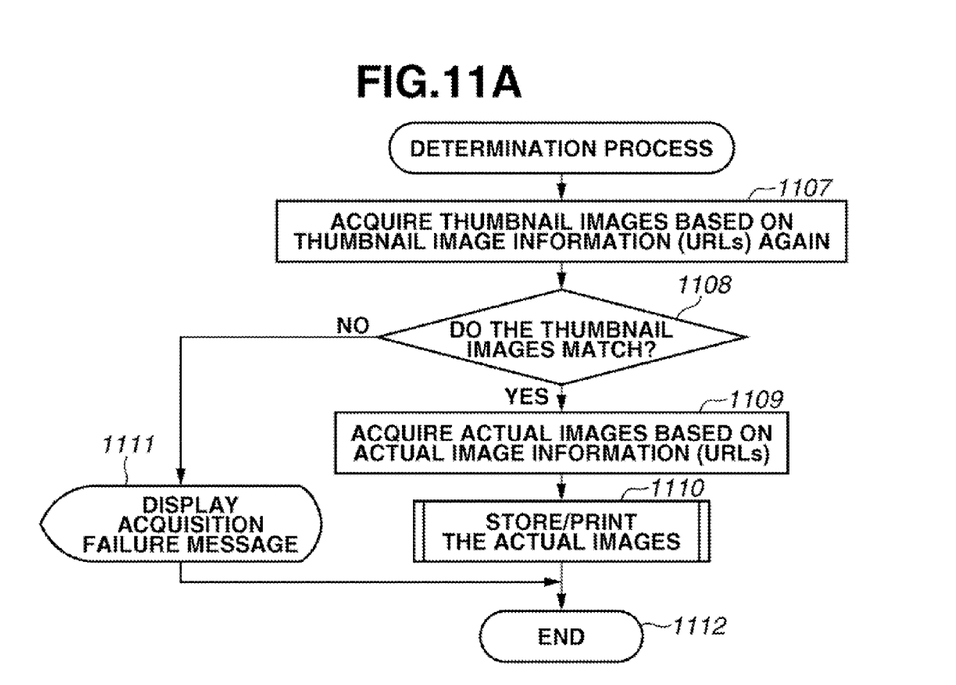
FIGS. 11A and 11B are flow charts according to third and fourth exemplary embodiments of the present invention, respectively.

In step S1107, by pressing the selection image storage/print button, the user acquires the desired thumbnail images, again. In step S1108, the image search module 302 compares the thumbnail images displayed in the list with the thumbnail images acquired again. If the thumbnail images match (YES in step S1108), in step S1109, the image search module 302 acquires the actual images. Next, in step S1110, the image search module 302 stores (or prints) the images. On the other hand, if the thumbnail images do not match (NO in step S1108), the image search module 302 determines that not all of the thumbnail images are the desired images. Next, in step S1111, instead of downloading the actual images, the message display unit 406 displays the acquisition failure message 801 (i.e., "not all of the actual images have been acquired").

A fourth exemplary embodiment according to the present invention will be described. Another method that does not download undesired actual images will be hereinafter described with reference to the flowchart in FIG. 11B. In the fourth exemplary embodiment, the same steps as steps 901 to 907 of the flow chart in FIG. 9 according to the first exemplary embodiment are used. Thus, the subsequent determination processes will be hereinafter described.

Figure 11B:
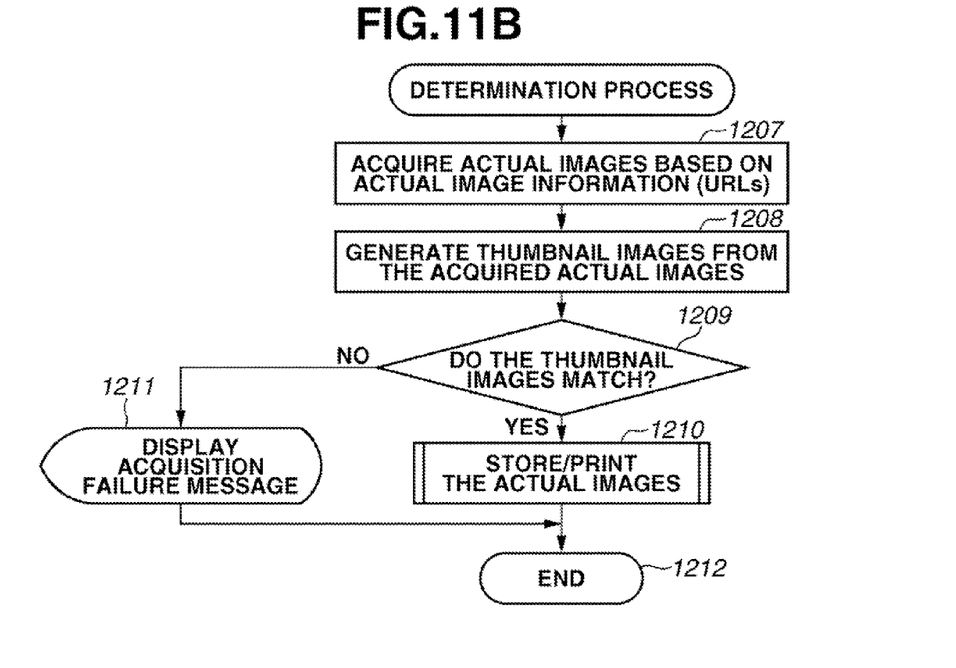

In step S1207, by pressing the selected image storage (or print) button, the user acquires the actual images. In step S1208, the image search module 302 generates thumbnail images from the acquired actual images. Next, in step S1209, the image search module 302 compares the thumbnail images displayed in the list with the thumbnail images generated from the actual images. If the thumbnail images match (YES in step S1209), in step S1210, the image search module 302 stores/prints the acquired actual images. On the other hand, if the thumbnail images do not match (NO in step S1209), in step S1211, the image search module 302 determines that not all of the acquired actual images are the desired images. As a result, instead of storing (or printing) the acquired actual images, the message display unit 406 displays the acquisition failure message 801 (i.e., "not all of the actual images have been acquired").

Figure 14:
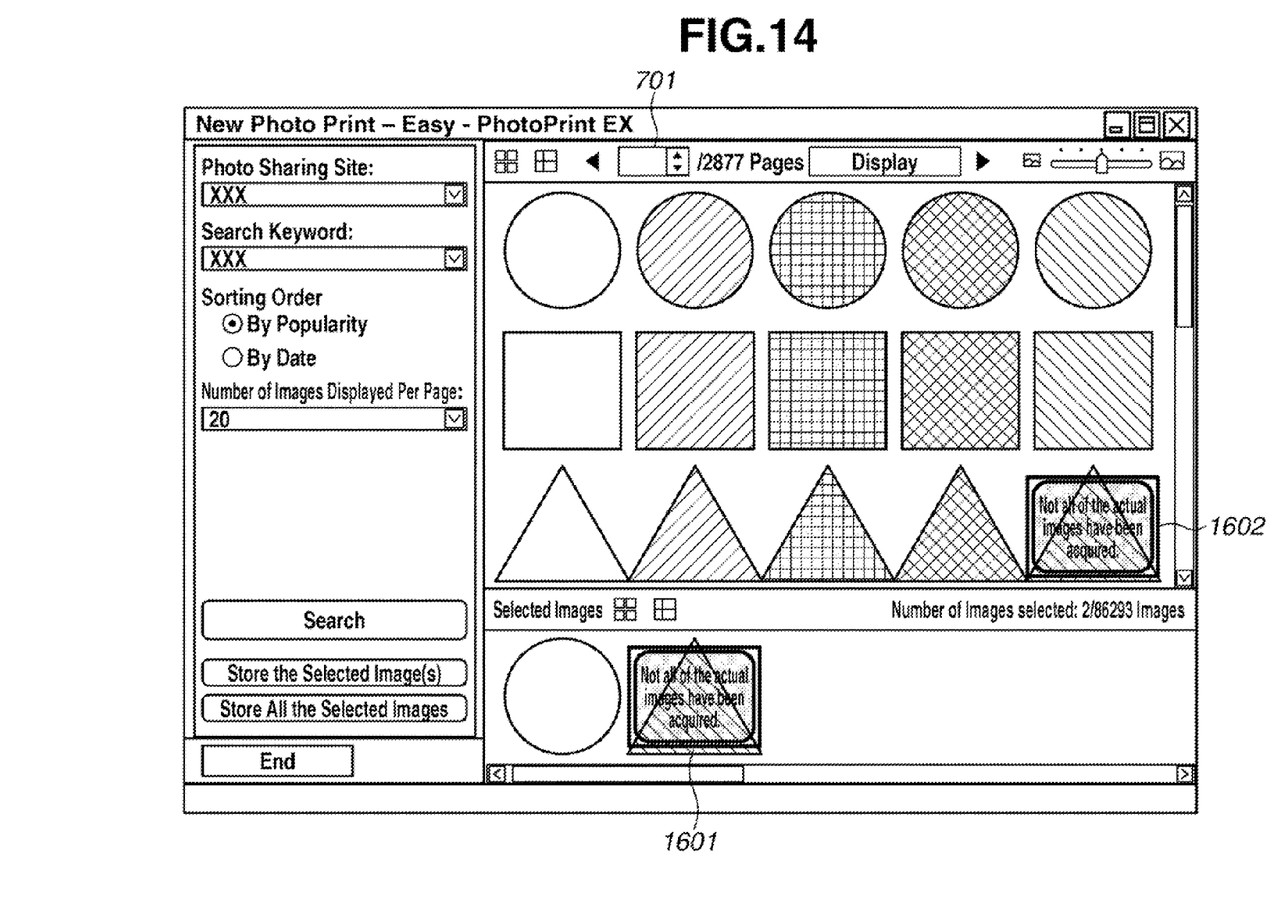
FIG. 14 illustrates another example of a notice of image search results obtained by the computer as the processing apparatus of the present invention.

Another example of displaying a notice of acquisition failure will be hereinafter described with reference to a example of GUI screen in FIG. 14. In FIG. 8, the acquisition failure message 801 is displayed overall on a separate screen. In this way, the user can recognize that images n which can not acquired are included in a plurality of desired images. Furthermore, as illustrated in FIG. 14, since acquisition failure messages 1601 and 1602 are displayed on the respective desired thumbnail images, the user can recognize which images cannot be acquired. Other than by attachment of messages, the message display unit 406 may display acquisition failure only by attachment of symbols or marks. In such a way, the user can recognize acquisition failure more clearly.

As described above, according to the present exemplary embodiment, since users acquire only the desired images, the users do not need to store unnecessary images. Thus, the disk capacity for the unnecessary images can be reduced. In addition, since users can determine actual images that do not need to be printed, unnecessary consumption of ink or expensive media can be avoided. In addition, since display of messages allows users to recognize that images which can not acquired are included in desired images, by reaffirming the message the users can execute appropriate operations, without the misconception that all of the desired images have been acquired.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-161941 filed Jul. 16, 2010, which is hereby incorporated by reference herein in its entirety.

What is claimed is:

1. A method comprising:
    extracting one or more URLs from among a plurality of URLs of thumbnail images of actual images corresponding to each other on a trilaterally one-to-one basis, wherein the extracted one or more URLs corresponds to an actual image having a predetermined image file format, a URL corresponding to an actual image having another file format is not extracted, and the thumbnail images and the actual images have been stored in a server system;
    requesting the one or more thumbnail images from the server system using the one or more URLs extracted by the extracting;
    causing a display device to display the one or more thumbnail images which are acquired from the server system in response to the requesting of the one or more thumbnail images;
    requesting, in a case where a thumbnail image among the one or more thumbnail images displayed by the display device is selected by a user, an actual image of the selected thumbnail image from the server system;
    receiving a URL corresponding to the selected thumbnail image from the server system, in response to the requesting of the actual image;
    acquiring an actual image which is stored in the server system, based on the received URL;
    determining, according to whether or not the acquired actual image which has been acquired by the acquiring has the predetermined image file format, whether or not to execute a predetermined process on the acquired actual image; and
    controlling execution of the predetermined process on the acquired actual image based on the determination by the determining, so that the predetermined process is not executed on the acquired actual image, in a case where the acquired actual image does not have the predetermined image file format, and so that the predetermined process is executed on the acquired actual image, in a case where the acquired actual image has the predetermined image file format.

2. The method according to claim 1, wherein the received URL indicates an image file format of the actual image which has been stored in the server system, and the determination is further executed based on the received URL.

3. The method according to claim 1, wherein in a case where the acquired actual image does not have the predetermined image file format, a notice indicating that the requested actual image corresponding to the thumbnail image cannot be acquired is displayed.

4. The method according to claim 3, wherein in a case where at least one actual image of at least one thumbnail image selected by the user is not acquired, the notice is displayed so that the at least one actual image among the one or more actual images is indicated.

5. The method according to claim 1, wherein the predetermined process is printing or storing the acquired actual image.

6. The method according to claim 1, wherein the requesting of the actual image is executed via the internet.

7. The method according to claim 4, wherein, regarding the display, the at least one thumbnail image is displayed with the notice.

8. A non-transitory computer-readable recording medium storing computer-executable instructions which, when run by a computer, cause the computer to execute the method according to claim 1.

9. A system comprising:
    an apparatus; and
    a relay server,
    wherein the relay server extracts one or more URLs from among a plurality of URLs of thumbnail images of actual images corresponding each other on a trilaterally one-to-one basis, wherein the extracted one or more URLs corresponds to an actual image having a predetermined image file format, a URL corresponding to an actual image having another file format is not extracted, and the thumbnail images and the actual images have been stored in a server system,
    and the relay server sends the one or more URLs extracted by the relay server, to the apparatus,
    wherein the apparatus comprising at least one processor being programmed to control one or more of:

a first requesting unit for requesting, without the relay server, the one or more thumbnail images from the server system using the one or more URLs sent by the relay server;

a causing unit for causing a display device to display the one or more thumbnail images which are acquired from the server system without the relay server in response to the requesting by the first requesting unit;

a second requesting unit for requesting, in a case where a thumbnail image among the one or more thumbnail images displayed by the display device is selected by a user, an actual image of the selected thumbnail image from the server system;

a receiving unit for receiving a URL corresponding to the selected thumbnail image from the server system, in response to the requesting by the second requesting unit;

an acquiring unit for acquiring an actual image which is stored in the server system, based on the received URL;

a determining unit for determining, according to whether or not the acquired actual image which has been acquired by the acquiring unit has the predetermined image file format, whether or not to execute a predetermined process on the acquired actual image; and a controlling unit for controlling execution of the predetermined process on the acquired actual image based on the determination by the determining unit, so that the predetermined process is not executed on the acquired actual image, in a case where the acquired actual image does not have the predetermined image the format, and so that the predetermined process is executed on the acquired actual image, in a case where the acquired actual image has the predetermined image file format.

10. The system according to claim 9,
wherein, before the acquiring of the actual image based on the received URL, it is determined whether the image the format indicated by the received URL is the predetermined image file format, based on the received URL.

11. The method according to claim 1, wherein the predetermined image file format is a JPEG file format.

12. The method according to claim 2, wherein, before acquisition of the actual image by the received URL, it is determined whether the image file format indicated by the received URL is the predetermined image file format, based on the received URL.

13. The system according to claim 9, wherein the predetermined image file format is a JPEG file format.

14. The method according to claim 12, wherein the acquiring of the actual image based on the received URL is not executed, in a case where it is determined that the image file format indicated by the received URL is not the predetermined image file format.

15. The method according to claim 1, wherein the actual image is requested from a redirect server in the server system, and the actual image is acquired based on the URL location which is received from the redirect server in response to the request.

16. The method according to claim 1, wherein thumbnail images corresponding to actual images each of which has the predetermined image the format are displayed,
and at least one actual image of at least one thumbnail image selected by the user is requested.

17. The method according to claim 1, wherein only the thumbnail image of the actual image which has the predetermined image file format and has been stored in the server system, is specified as a display target, among the thumbnail images of the actual images which have been stored in the server system.

18. The method according to claim 1, wherein a relay server different from the server system, executes the extracting.

* * * * *